United States Patent [19]
Helstern et al.

[11] Patent Number: 5,295,050
[45] Date of Patent: Mar. 15, 1994

[54] DISPLAY SYSTEM

[75] Inventors: Robert P. Helstern, Costa Mesa; Vanacan Tatavossian, Mission Viejo, both of Calif.

[73] Assignee: Eaton Corporation, Cleveland, Ohio

[21] Appl. No.: 980,597

[22] Filed: Nov. 23, 1992

[51] Int. Cl.[5] .......................................... G01D 11/28
[52] U.S. Cl. ...................................... 362/27; 362/30; 362/244; 362/339; 362/812; 40/546; 340/815.41; 340/815.42
[58] Field of Search .................. 362/26, 27, 30, 244, 362/246, 339, 812; 40/546, 564, 573; 340/815.31, 815.32

[56] References Cited
U.S. PATENT DOCUMENTS

| | | | |
|---|---|---|---|
| 1,635,863 | 7/1927 | Schulz et al. | 362/812 X |
| 2,576,849 | 11/1951 | Moore | 362/293 X |
| 2,907,249 | 10/1959 | Hjermstad | 362/329 X |
| 4,141,058 | 2/1979 | Mizohata et al. | 362/812 X |
| 4,794,492 | 12/1988 | Vinther | 362/812 X |
| 5,039,832 | 8/1991 | Polacek et al. | 200/317 |

OTHER PUBLICATIONS

4-Lamp Pushbutton Switches-Series 10E & 10H Twist-Lite, published by MSC Products Eaton Croporation, no publication data.

Primary Examiner—Stephen F. Husar
Attorney, Agent, or Firm—Tarolli, Sundheim & Covell

[57] ABSTRACT

An improved display system includes a prism having a pair of light receiving faces which intersect at an apex. The prism has a light emitting face from which light transmitted. The light emitting face of the prism has a series of parallel linear V-shaped grooves with side surfaces which intersect to form a series of parallel linear ridges which disperse rays of light. A display panel is disposed adjacent to the prism and has a rear side with indicia thereon. The indicia can be read from a front side of the display panel, even in bright sunlight, when a pair of light sources are energized. However, when the light sources are not energized, the indicia on the display panel cannot be observed. A divider panel separates the light sources to enable an observer to determine when one of the light sources is burned out. Reflectors direct light from the light sources toward the light receiving faces of the prism.

19 Claims, 3 Drawing Sheets

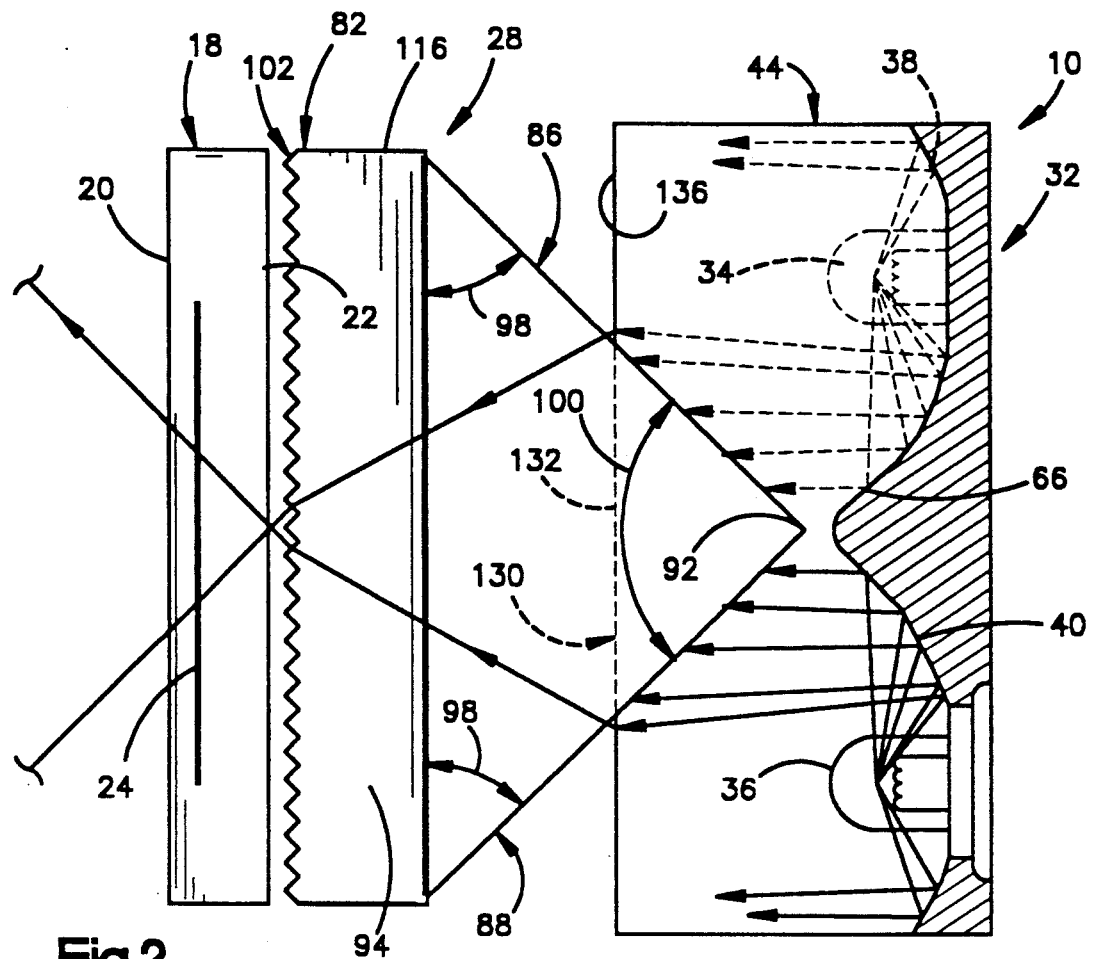
Fig.2
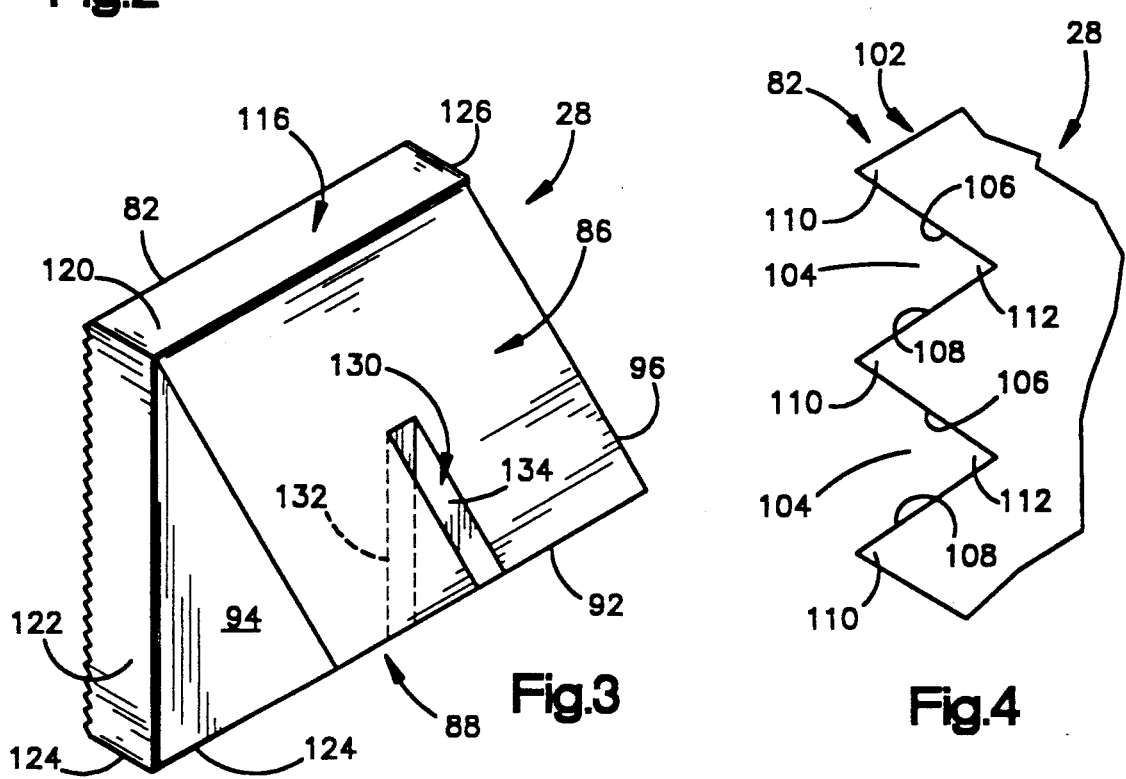
Fig.3
Fig.4

DISPLAY SYSTEM

BACKGROUND OF THE INVENTION

An improved display system has indicia which is readable in bright sunlight when a light source within the display system is energized. However, when the light source in the display system is not energized, the indicia is not readable, even in bright sunlight.

Air crew station signaling devices used in military and commercial aircraft, are frequently exposed to high ambient incident illumination (direct sunlight irradiation). These signaling devices must maintain a high brightness contrast characteristic when the signaling device is activated in order to enable indicia on the signaling device to be read. However, when the signaling device is inactive and is exposed to high ambient incident illumination, the indicia should not be readable in order to avoid the transmission of false signals to the crew of the aircraft.

Known signalling devices for the crew of an aircraft have a plurality of miniature incandescent lamps which provide illumination of indicia. Signal intensity, brightness, uniformity, and color with which the indicia are seen by observers, are the collective result of the arrangement of optical filters and other associated optical components. To achieve high brightness contrast characteristics suitable for a direct sunlight environment, high candle power, high wattage type miniature incandescent lamps have been used. These lamps have previously been employed in as many as four in a group, but not less than two, usually arranged parallel or symmetrically to the indicia.

The use of high energy miniature incandescent lamps to achieve high brightness contrast, presents some disadvantages that are detrimental to the operating characteristics of the signalling device. Some of the disadvantages include relatively high power consumption in order to obtain the necessary illumination. The high power consumption may result in excessive temperatures within the signalling device. The excessive temperatures may be so great as to cause the temperature of the signalling device to exceed touch temperature limits. The high power consumption may result in the incandescent lamps having a relatively short operating life. Thus, there is a need for a signalling device which is readable in direct sunlight without the thermal problems normally associated with four-lamp systems which have previously been used.

SUMMARY OF THE INVENTION

An improved display system is readable in bright sunlight. The display system includes a prism having a pair of light receiving faces disposed in planes which intersect at an apex. When a source of light is energized, light is transmitted to the light receiving faces of the prism. The light is transmitted through the prism from the light receiving faces to a light emitting face of the prism. The light emitting face of the prism has a series of parallel V-shaped grooves. The V-shaped grooves have side surfaces which disperse rays of light transmitted from the light receiving faces of the prism to the light emitting face of the prism.

A display panel is disposed in front of the light emitting face of the prism. Indicia on the display panel is exposed to light transmitted from the light emitting face of the prism. This indicia is observable when the source of light is energized, even when the display panel is exposed to bright sunlight. However, the indicia on the display panel is obscured when the source of light is not energized.

The source of light includes a pair of light emitting elements which are separated by a divider panel. The divider panel extends into a slot formed in the prism. An observer of the display panel can readily determine when one of the light emitting elements fails to emit light.

BRIEF DESCRIPTION OF THE DRAWINGS

The foregoing and other features of the present invention will become more apparent upon a consideration of the following description taken in connection with the accompanying drawings, wherein:

FIG. 2 is a highly schematicized illustration of a portion of the display system of FIG. 1 and indicating the manner in which light from a pair of sources is transmitted through a prism to illuminate a display panel;

FIG. 3 is a somewhat schematicized pictorial illustration of the prism of FIG. 2;

FIG. 4 is an enlarged, fragmentary and somewhat schematicized illustration of V-shaped grooves formed in a light emitting face of the prism of FIGS. 2 and 3;

DESCRIPTION OF ONE SPECIFIC PREFERRED EMBODIMENT OF THE INVENTION

General Description

Figure 1:
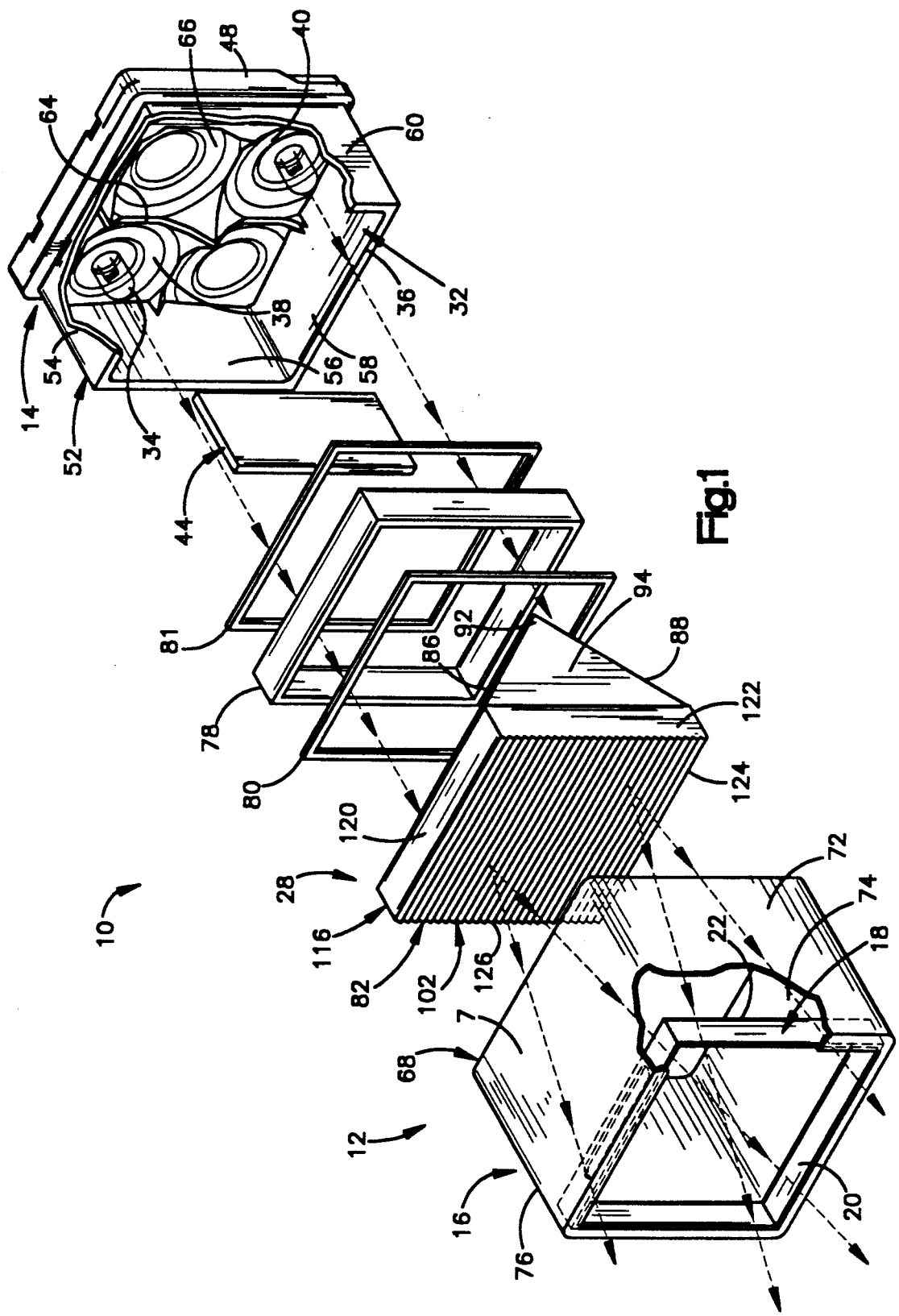
FIG. 1 is an exploded fragmentary schematicized view of a display system constructed in accordance with the present invention.

A display system 10, which is readable in bright sunlight, is illustrated in FIG. 1. The display system 10 includes a housing 12 having a base or rear capsule 14 and an outer or front section 16. A display panel or lens 18 is disposed in the front section 16 of the housing. The display panel or lens 18 has vertical (as viewed in FIGS. 1 and 2) front or outer and rear or inner side surfaces 20 and 22 with suitable indicia 24 (FIG. 2). Although the indicia 24 is preferably located within the display panel 18, the indicia could be located on the rear or inner side surface 22 if desired. The front or outer side surface 20 of the display panel 18 forms an end surface of the housing 12 (FIG. 1) and is exposed to an observer.

In accordance with one of the features of the invention, a prism 28 directs light onto the rear or inner side 22 of the display panel 18 with a uniform distribution of illumination. The uniform distribution of illumination provided by the prism 28 enables the indicia 24 on the display panel 18 to be readily read, even in bright sunlight, when the display system 10 is activated. However, when the display system 10 is in an inactive condition, the indicia 24 is obscured, even when the front or outer side surface 20 of the display panel 18 is exposed to bright sunlight.

A selectively energizeable source 32 of light is provided in the base or rear capsule 14. The selectively energizeable source of light 32 includes a low wattage incandescent lamp 34 disposed in an upper left (as viewed in FIG. 1) portion of the base or rear capsule 14. The selectively energizeable source 32 of light also includes a second low wattage incandescent lamp 36 which is disposed in a lower right (as viewed in FIG. 1) portion of the base or rear capsule 14.

In one specific embodiment of the invention, the lamps 34 and 36 each had a power requirement of 0.30 watts. Due to the low power requirements of the lamps 34 and 36, any tendency for heat to build-up in the housing 12 is minimized. By minimizing the build-up of heat in the housing 12, the operating life of the lamps 34 and 36 tends to be maximized. Known devices other than incandescent lamps could be used as the light source 32 if desired.

Reflectors 38 and 40 are associated with the lamps 34 and 36 and have a known multi-facet configuration. The reflectors 38 and 40 direct light from the lamps 34 and 36 toward the rear side of the prism 28 when the lamps 34 and 36 are energized. Thus, light rays are transmitted directly from the lamps 34 and 36 to the prism 28 and are also transmitted from the reflectors 38 and 40 to the prism. Due to the multi-facet configuration of the reflectors 38 and 40, the rays of light from the reflectors are generally horizontal (as viewed in FIGS. 1 and 2).

An opaque divider panel 44 is provided between the lamps 34 and 36. The divider panel 44 cooperates with the lamps 34 and 36, prism 28 and display panel 18 in such a manner that the majority of the light from the lamp 34 is transmitted through the prism 28 to the left (as viewed in FIG. 1) half of the display panel 18 while the majority of the light from the lamp 36 is transmitted through the prism 28 to the right (as viewed in FIG. 1) half of the display panel 18. It should be understood that some of the light from the left lamp 34 will be transmitted through the prism 28 to the right side of the display panel 18. Also, some of the light from the right lamp 36 will be transmitted through the prism 28 to the left side of the display panel 18.

By using the opaque divider panel 44 and reflectors 38 and 40 to direct the majority of the light from the left lamp 34 to the left side of the display panel 18 and the majority of the light from the right lamp 36 to the right side of the display panel 18, an observer can detect when one of the two lamps 34 or 36 is not energized while the other lamp is energized. Thus, if the left lamp 34 is not energized while the right lamp 36 is energized, the right half of the display panel 18 will appear to be brighter to the observer than the left half of the display panel. This clearly indicates to the observer that the left lamp is not energized. Similarly, if the right lamp is not energized while the left lamp is energized, the left half of the display panel 18 will be brighter than the right half of the display panel. This clearly indicates to the observer that the right lamp 36 is not energized.

Housing

The housing 12 encloses the components of the display system 10. The base or rear capsule 14 of the housing 10 includes a rectangular end wall 48 (FIG. 1) in which the incandescent lamps 34 and 36 and reflectors 38 and 40 are located. The lamps 34 and 36 are connected, on the rear side of the end wall 48, with electrical circuitry which energizes both of the lamps when it is desired to have an observer view the indicia 24 (FIG. 2) on the display panel 18. It is contemplated that the indicia 24 will indicate to an observer that a particular event has occurred or is occurring.

A rectangular array 52 of side walls 54, 56, 58 and 60 extends axially outwardly from the end wall 48 and encloses the lamps 34 and 36. A vertical (as viewed in FIG. 1) slot 64 extends from a multi-faceted front surface 66 of the end wall 48 part way through the end wall. The slot 64 extends between horizontal upper and lower side walls 54 and 58.

The divider panel 44 is received in the slot 64 and engages the side walls 54 and 58 to divide the housing 12 into two rear compartments, that is a left (as viewed in FIG. 1) compartment containing the lamp 34 and a right compartment containing the lamp 36. The divider panel 44 partially blocks the transmission of light from one compartment of the housing to the opposite compartment of the housing so that a burning out or other failure of a lamp 34 or 36 can be readily detected by an observer. It is contemplated that the end wall 48 could be provided with a horizontal slot corresponding to the vertical slot 64. This would enable the orientation of both the panel 44 and prism 28 to be rotated by 90° about a horizontal axis from the position shown in FIG. 1

The outer or front section 12 of the housing includes a rectangular array 68 of side walls 70, 72, 74, and 76. The rectangular array 68 of side walls 70-76 extends around the periphery of the display panel 18 and supports the display panel. The rectangular array 68 of side walls 70-76 telescopically encloses the rectangular array 52 of side walls 54-60 on the base or rear capsule 14. The prism 28 is positioned relative to the base 14 by a rectangular spacer 78 and is enclosed by seals 80 and 81.

Prism

In accordance with one of the features of the invention, the prism 28 is provided in the display system 10 between the lamps 34 and 36 and the display panel 18. The prism 28 performs a plurality of functions. Thus, the prism 28 provides light centerline compensation, permits the placement of the lamps 34 and 36 to be offset relative to the indicia 24 (FIG. 2), corrects and enhances the direction of specific reflected rays, and expands the spatial distribution of the natural lamp intensities. In addition, the prism 28 has a light emitting face 82 which provides for uniform light ray distribution and creates a wide angle (when viewed from within the frustum of an imaginary cone) distribution of existing light rays with resulting ray crossover to produce uniform illumination on the rear side surface 22 and indicia 24 on the display panel 18.

The prism 28 has a pair of flat rectangular light receiving faces 86 and 88 (FIGS. 2 and 3). Light from the lamps 34 and 36 (FIG. 2) and reflectors 38 and 40 is directed onto the light receiving faces 86 and 88. The majority of the light from the lamp 34 is directed from the lamp itself and from the reflector 38 to the light receiving face 86 of the prism 28. However, a substantial amount of the light from the lamp 34 will be reflected within the housing 12 and will eventually be directed to the light receiving face 88 of the prism 28. Similarly, the majority of the light from the lamp 36 is directed from the lamp itself and from the reflector 40 to the light receiving face 88 of the prism 28. However, a substantial amount of the light from the lamp 36 will be reflected within the housing 12 and will eventually be transmitted to the light receiving face 86 of the prism 28.

The light receiving faces 86 and 88 of the prism 28 extend transversely to each other and intersect at a horizontal (as viewed in FIGS. 1 and 2) linear apex 92. The apex 92 of the prism 28 extends parallel to and is disposed halfway between the side walls 54 and 58 of the base 14. The apex 92 of the prism 28 extends parallel to the end wall 48 of the base 14. The horizontal apex 92 of the prism 28 extends between vertical (as viewed in FIGS. 1 and 2) and generally triangular opposite end faces 94 and 96 (FIGS. 2 and 3) of the prism 28.

The light receiving faces 86 and 88 and the apex 92 extend perpendicular to the end faces 94 and 96 of the prism 28. Although only the generally triangular end face 94 is clearly visible in FIGS. 2 and 3, it should be understood that the end face 96 extends parallel to the end face 94 and has the same configuration as the end face 94.

The vertical (as viewed in FIG. 1) light emitting face 82 of the prism 28 extends between and is perpendicular to the end faces 94 and 96 (FIG. 3). The light receiving faces 86 and 88 are disposed in planes which extend at an angle of 40°, indicated schematically at 98 in FIG. 2, to the light emitting face 82 of the prism 28. Thus, the prism 28 has an angle, indicated schematically at 100 in FIG. 2, of 100° at the apex 92 and has a pair of 40° angles between the light receiving faces 86 and 88 and the light emitting face 82. A horizontal (as viewed in FIGS. 1 and 2) plane contains the apex 92 and bisects the angle between the light receiving faces 86 and 88 at the apex 92. If desired, the prism 28 could be constructed with angles which are different than the specific angles set forth above.

In accordance with one of the features of the invention, a series 102 (FIG. 4) of linear V-shaped grooves 104 extend across the light emitting face 82 of the prism 28. The parallel V-shaped grooves 104 promote uniform distribution of light rays and create a wide angle, as viewed from within the frustum of an imaginary cone, of distribution of light rays transmitted from the light emitting face 82 of the prism 28 (FIGS. 1 and 2). The V-shaped grooves 104 result in light ray crossover which also promotes uniform distribution of light transmitted from the light emitting face of the prism 28.

Each of the V-shaped grooves 104 is defined by a pair of flat linear side surfaces 106 and 108 (FIG. 4) which intersect at linear ridges or peaks 110 and linear valleys or troughs 112. In the illustrated embodiment of the invention, the included angle between a pair of flat side surfaces 106 and 108 at a valley 112 is 80°. The included angle between a pair of side surfaces 106 and 108 at a peak or ridge 110 is also 80°. The horizontal (as viewed in FIGS. 1, 2 and 4) peaks 110 and valleys 112 extend across the light emitting face 82 of the prism 28. The peaks 110 and valleys 112 extend parallel to the light receiving faces 86 and 88 and to the apex 92 (FIG. 2) of the prism 28.

As light is transmitted along many different paths and at many different angles from the light receiving faces 86 and 88 of the prism 28, the light passes through the prism to the light emitting face 82. Due to the different angular orientations of the paths along which the light rays are transmitted to the light emitting face 82, the light rays are projected from the side surfaces 106 and 108 (FIG. 4) of the V-shaped grooves 104 at many different angles. Thus, at any given point on a side surface 106 or 108 of a V-shaped groove, light rays may be simultaneously projected at many different angles relative to the side surface. This results in crossover, that is intersection, of light rays from the side surfaces 106 with the light rays from the side surfaces 108 of the V-shaped grooves.

In one specific embodiment of the invention, the V-shaped grooves 104 had a depth of approximately 0.010 inches. Thus, the horizontal distance between a vertical (as viewed in FIG. 4) plane through the apexes of the ridges or peaks 110 and a vertical plane through the apexes of the valleys 112 is approximately 0.010 inches. The distance from one peak 110 to the next adjacent peak, as measured along a vertical (as viewed in FIG. 4) plane through the apexes of the peaks, is approximately 0.020 inches. Of course, the distance between the apexes of the valleys 112 is equal to the distance between the apexes of the peaks 110. It should be understood that the specific dimensions and angles for the V-shaped grooves 104 have been set forth herein for purposes of clarity of description. It is contemplated that the light emitting face 82 of the prism 28 may be constructed with V-shaped grooves having different angles and/or dimensions.

In the illustrated embodiment of the invention, the V-shaped grooves 104 extend across the light emitting face 82 of the prism 28 in a direction which is parallel to the apex 92 of the prism (see FIGS. 1 and 2). However, it is contemplated that the V-shaped grooves 104 could be oriented with their longitudinal axes extending perpendicular to the longitudinal axis of the apex 92 of the prism. If this was done, the V-shaped grooves 104 would extend parallel to the end faces 94 and 96 rather than perpendicular to the end faces, as in the illustrated embodiment of the invention.

A rectangular mounting section 116 (FIG. 1) is advantageously provided on the prism 28 adjacent to the light emitting face 82. The mounting section 116 is formed by a rectangular array of flat side surfaces 120, 122, 124 and 126 (FIGS. 1 and 3). Although only the surfaces 120 and 122 are clearly shown in FIGS. 1 and 3, it should be understood that the surfaces 124 and 126 have the same configuration as the surfaces 120 and 122.

The mounting section 116 of the prism 28 is engaged by the rectangular array 52 (FIG. 1) of side walls 54-60 extending from the end wall 48 of the housing 12 to support the prism in the housing. The seals 80 and 81 (FIG. 1) prevent light from leaking around the prism 28 rather than going through the prism. The spacer 78 provides an integral load bearing cross-section for seal compression.

A slot 130 (FIG. 3) is formed in the rearward portion of the prism 28. The slot 130 extends from the apex 92 to a flat bottom surface 132 disposed within the prism. The flat bottom surface 132 is disposed in a vertical (as viewed in FIGS. 2 and 3) plane which is parallel to the light emitting face 82 of the prism and perpendicular to the end faces 94 and 96 of the prism. The bottom surface 132 of the slot 130 intersects the light emitting faces 86 and 88 of the prism at an angle of 40°. The slot 130 has parallel, triangular side surfaces 133 and 134 (FIG. 3) which extend perpendicular to the apex 92.

The divider panel 44 extends into the slot 130 (FIG. 2). A front edge 136 of the divider panel 44 is disposed in abutting engagement with the bottom surface 132 of the slot 130. Opposite side surfaces of the divider panel 44 are disposed in flat abutting engagement with the side surfaces 133 and 134 of the slot 130. This results in the divider panel 44 extending part way through the rear portion of the prism 28.

The opaque divider panel 44 blocks the transmission of light rays between a portion of the prism disposed on one side of the slot 130 and a portion of the prism disposed on the other side of the slot. Thus, light rays from the lamps 34 and 36 are blocked from being transmitted sideways through the rearwardmost portion of the prism 28 by the divider panel 44. By having the divider panel 44 extend into the slot 130, the tendency for the lamp 34 to illuminate the left (as viewed in FIG. 1) portion of the prism 28 is enhanced. In addition, the tendency for the lamp 36 to illuminate the right (as viewed in FIG. 1) portion of the prism 28 is enhanced.

In the illustrated embodiment of the invention, the prism 28 is formed from a single, generally triangular, piece of transparent material, specifically, polymethylmethacrylate. This material is commercially available from Rohm & Haas Corporation under the designation of ACRYLIC/PLEXIGLASS. It is believed that the index of refraction of the prism 28 is approximately 1.5. Of course, the prism 28 could be formed of different materials if desired. The foregoing description of the specific material from which the prism is formed has been set forth herein for purposes of clarity of description and not for purposes of limitation of the invention.

Display Panel

The display panel or lens 18 (FIGS. 1 and 2) has a known construction with generally parallel major side surfaces 20 and 22. Indicia 24 (FIG. 2) is provided between the major side surfaces 20 and 24 of the display panel 18. The rear side surface 22 of the display panel 18 is substantially uniformly illuminated by light transmitted from the light emitting face 82 of the prism 28. The display panel 18 contains filters which block the transmission of visible radiant energy. This prevent the indicia 24 from being readable by an observer when the front side surface 20 of the display panel 18 is illuminated by bright sunlight.

Figure 5:
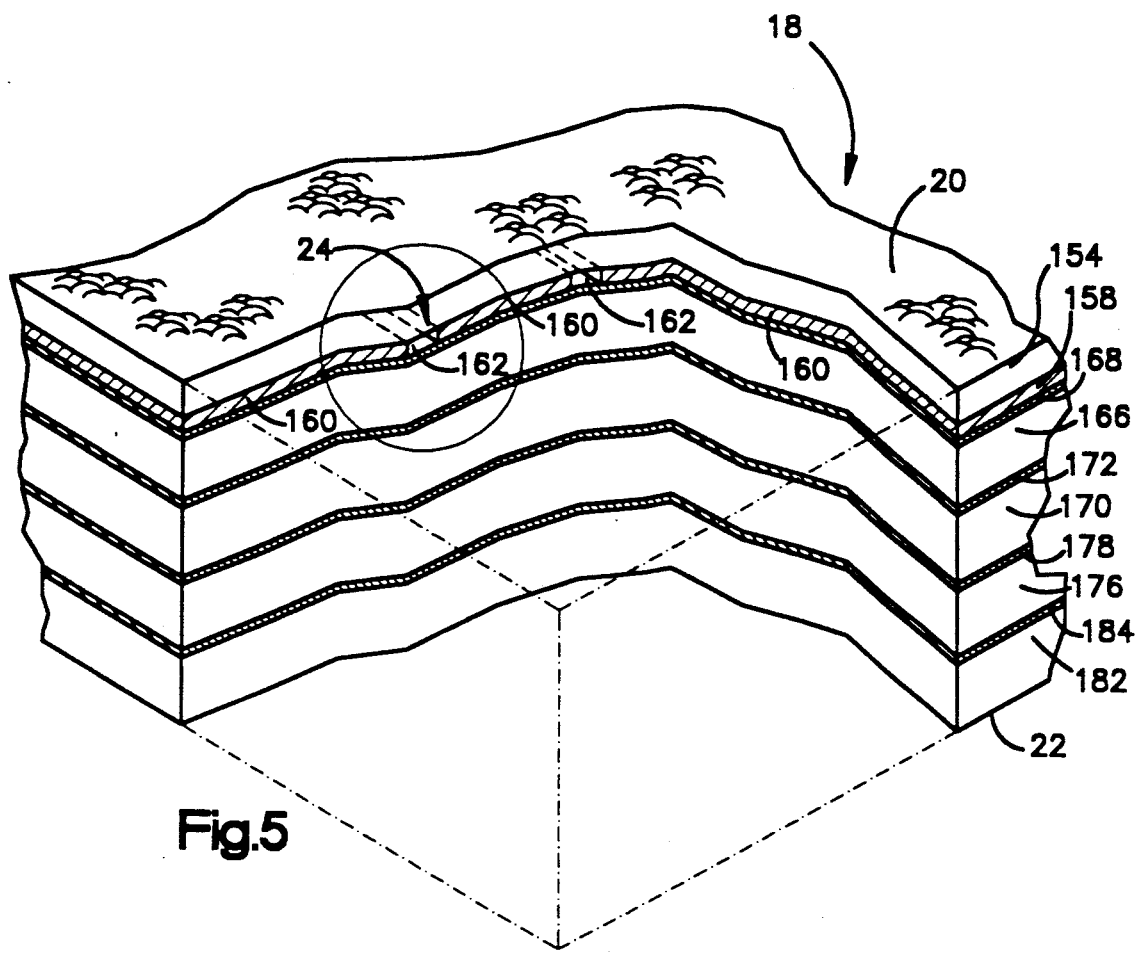
FIG. 5 is a fragmentary sectional view of a portion of the display panel.

It is contemplated that the display panel 18 could have any one of many different known constructions. The known construction of one specific embodiment of the display panel 18 is illustrated in FIG. 5. In this specific embodiment of the display panel 18, the display panel is formed by a plurality of layers which are interconnected by a clear optical adhesive. The front or outer side surface 20 is formed on the upper (as viewed in FIG. 5) layer 154 of the panel 18. The front side surface 20 is abraded to provide a non-glare diffusing surface over the entire front side surface. It should be understood that the roughness of the front side surface 20 has been, to some extent at least, exaggerated in FIG. 5 for purposes of clarity of illustration.

The upper (as viewed in FIG. 6) layer 154 is a clear filter. The indicia 24 is disposed in a layer 158 immediately below the layer 154. The upper layer 154 acts as a carrier for the layer 158. The layer 158 includes opaque sections 160 (FIGS. 5 and 6) and transparent or open sections 162 filled with clear optical adhesive. The transparent or open sections 162 have a configuration corresponding to the desired configuration of the indicia 24. The opaque sections 160 are formed of black ink and define the edge portions of the indicia 24.

The layer 158 is connected with a next lower (as viewed in FIG. 5) layer 166 by a transparent layer 168 of clear optical adhesive. The layer 166 is a medium diffuser which provides for a mild diffusion of light. The layer 166 is connected to the next lower layer 170 (FIG. 5) by a transparent layer 172 of clear optical adhesive.

The layer 170 is a gray filter. The layer 170 inhibits the viewing of the indicia 24 in direct sunlight and allows the display 18 to be sunlight readable when the display panel 18 is exposed to direct sunlight.

The next lower layer 176 (FIG. 5) is connected to the layer 170 by a transparent layer 178 of clear optical adhesive. The layer 176 is formed of a suitable background color, such as red or green. Finally, a lowermost layer 182 is connected with the layer 176 by a layer 184 of optical adhesive. The layer 182 is a clear filter. The layer 182 is provided to adjust the overall thickness of the display panel 18.

Figure 6:
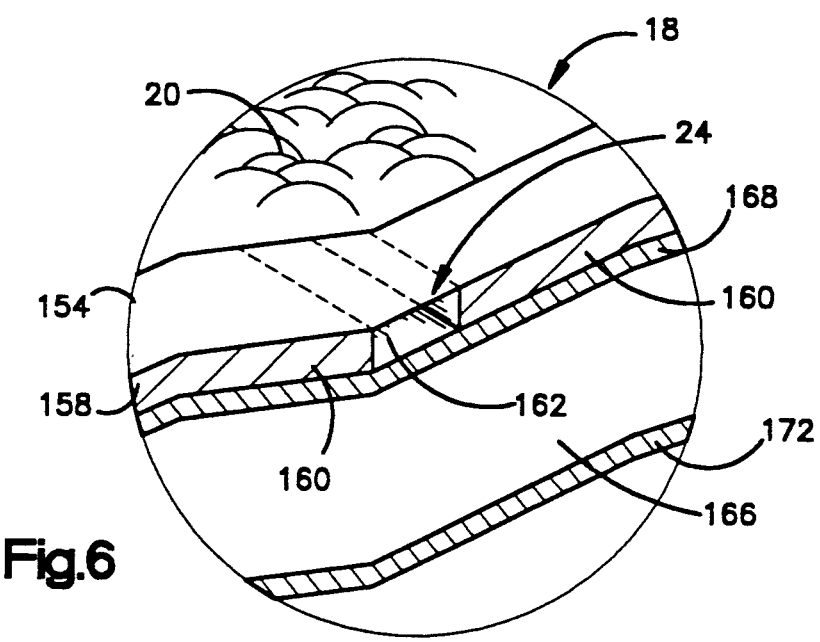
FIG. 6 is an enlarged view of an encircled portion of FIG. 5.

Although one specific embodiment of the display 18 has been illustrated in FIGS. 5 and 6, it should be understood that the display panel 18 could have many different constructions. For example, the indicia 24 could be positioned at a location other than immediately behind the upper layer 154 of the display panel. Thus, depending upon the specific conditions in which the display system 10 is to be used, the construction of the display panel 18 can be varied to provide the desired characteristics for these conditions.

Conclusion

An improved display system 10 is readable in bright sunlight. The display system includes a prism 28 having a pair of light receiving faces 86 and 88 disposed in planes which intersect at an apex 92. When a source 32 of light is energized, light is transmitted to the light receiving faces 86 and 88 of the prism 28. The light is transmitted through the prism 28 from the light receiving faces 86 and 88 to a light emitting face 82 of the prism. The light emitting face 82 of the prism has a series 102 of parallel V-shaped grooves 104. The V-shaped grooves 104 have side surfaces 106 and 108 which disperse rays of light transmitted from the light receiving faces 86 and 88 of the prism to the light emitting face 82 of the prism.

A display panel 18 is disposed in front of the light emitting face 82 of the prism 28. Indicia 24 on the display panel 18 is exposed to light transmitted from the light emitting face 82 of the prism. The indicia 24 is observable when the source 32 of light is energized, even when the display panel 18 is exposed to bright sunlight. However, the indicia 24 on the display panel 18 is obscured when the source of light is not energized.

The source 32 of light includes a pair of light emitting elements or lamps 34 and 36 which are separated by a divider panel 44. The divider panel 44 extends into a slot 130 formed in the prism 28. An observer of the display panel 18 can readily determine when one of the light emitting elements 34 or 36 fails to emit light.

Having described the invention, the following is claimed:

1. A display system which is readable in bright sunlight, said display system comprising a housing, energizeable means disposed in said housing for providing light when said energizeable means is energized, a prism disposed in said housing and having a generally triangular cross sectional configuration, said prism having a pair of light receiving faces disposed in planes which intersect at an apex adjacent to said energizeable means and which receive light from said energizeable means when said energizeable means is energized, said prism having a light emitting face through which light which enters said prism through said light receiving faces is emitted, said light emitting face having a series of parallel V-shaped grooves formed therein, said V-shaped grooves having side surfaces which intersect to form a series of parallel ridges extending across said light emitting face of said prism to disperse rays of light transmitted from said light receiving faces through said prism to said light emitting face of said prism, and a display panel disposed in said housing adjacent to said light emitting face of said prism, said display panel having a major side surface forming at least a portion of an outer side of said housing and extending parallel to said light emitting face of said prism, said display panel having indicia thereon which is exposed to light transmitted from said light emitting face of said prism and which is observable when said energizeable means is energized even when said display panel is exposed to bright sunlight, the indicia on said display panel being obscured when said energizeable means is not energized and said display panel is exposed to bright sunlight.

2. A display system as set forth in claim 1 wherein said energizeable means includes a plurality of light sources, said system further including a divider panel which is disposed between said plurality of light sources and has major side surfaces which extend perpendicular to the major side surface of said display panel to enable an observer of said display panel to determine when one of said plurality of light sources fails to emit light upon energization of said energizeable means.

3. A display system as set forth in claim 1 wherein the apex at which planes containing said light receiving faces of said prism intersect extends parallel to said plurality of ridges which extend across said light emitting face of said prism.

4. A display system as set forth in claim 1 wherein said light receiving faces and said light emitting face of said prism all have a generally rectangular configuration, said light receiving faces being skewed at equal angles to said light emitting face of said prism.

5. A display system as set forth in claim 1 wherein said housing has first and second parallel side walls disposed on opposite sides of said prism and extending perpendicular to said light emitting face of said prism, the apex at which planes containing said light receiving faces of said prism intersect being disposed midway between said first and second side walls.

6. A display system as set forth in claim 5 further including a divider panel extending perpendicular to said first and second side walls of said housing, a first portion of said energizeable means being disposed adjacent to a first side of said divider panel and a second portion of said energizeable means being disposed adjacent to a second side of said divider panel to enable an observer to determine when one of said portions of said energizeable means fails to emit light.

7. A display system as set forth in claim 5 wherein said prism includes surface means for defining a slot which extends transversely to the apex at which the planes containing said light receiving faces of said prism intersect, said slot extending away from the apex and into said prism to a location which is disposed between the apex and light emitting face of said prism, a divider panel partially disposed in the slot in said prism, said divider panel extending through said light receiving faces, said divider panel extending perpendicular to said first and second side walls of said housing to at least partially define first and second compartments in said housing, said energizeable means including a first light source disposed in the first compartment and a second light source disposed in the second compartment.

8. A display system as set forth in claim 5 wherein said parallel ridges extending across said light emitting face of said prism have longitudinal axes extending parallel to a longitudinal axis of the apex at which the planes containing said light receiving faces of said prism intersect.

9. A display system as set forth in claim 1 wherein said prism is formed from a single piece of material and includes a rectangular mounting section, said mounting section including a first pair of parallel flat side surfaces disposed in planes extending parallel to longitudinal axes of said parallel linear ridges and a second pair of parallel flat side surfaces extending perpendicular to said first pair of parallel flat side surfaces, said light emitting face of said prism being disposed on a side of said mounting section opposite from the apex at which the planes containing said light receiving faces of said prism intersect.

10. A display system comprising a housing, energizeable means disposed in said housing for providing light when said energizeable means is energized, and a prism disposed in said housing and having a generally triangular cross sectional configuration, said prism having a pair of parallel and generally triangular end faces, a pair of flat rectangular light receiving faces which intersect at an apex disposed adjacent to said energizeable means and which extend between said end faces, said light receiving faces being exposed to light transmitted from said energizeable means when said energizeable means is energized, said prism having a rectangular light emitting face through which light which enters said prism through the light receiving faces is emitted, said light emitting face extending perpendicular to said end faces and having a series of parallel linear V-shaped grooves formed therein, said V-shaped grooves having side surfaces which intersect to form a series of parallel linear ridges extending across said light emitting face of said prism to disperse rays of light transmitted from said light receiving faces through said prism to said light emitting face of said prism, said ridges having longitudinal axes which extend perpendicular to said end faces and parallel to a longitudinal axis of the apex at which said light receiving faces of said prism intersect, said apex at which said light receiving faces intersect being disposed in a plane which extends perpendicular to said light emitting face of said prism and which bisects an angle formed by the intersection of said light receiving faces.

11. A display system as set forth in claim 10 wherein said prism includes surface means forming a slot formed in said prism midway between said end faces, said slot extending from the apex at which said light receiving faces of said prism intersect into said prism to a location between said light emitting face of said prism and the apex, said slot having open ends formed in said light receiving faces of said prism, and a divider panel partially disposed in the slot in said prism and cooperating with said housing to at least partially define first and second compartments in said housing, said energizeable means including a first light source disposed in the first compartment and a second light source disposed in the second compartment.

12. A display system as set forth in claim 11 further including a display panel disposed in said housing adjacent to said light emitting face of said prism, said display panel having a major side surface forming at least a portion of an outer side of said housing and extending parallel to said light emitting face of said prism, said display panel having indicia thereon which is exposed to light transmitted from said light emitting face of said prism.

13. A display system as set forth in claim 10 wherein said energizeable means includes a first light source, a first reflector for directing at least a portion of the light from said first light source toward a first one of said light receiving faces, a second light source, and a second reflector for directing at least a portion of the light from said second light source toward a second one of said light receiving faces.

14. A display system comprising a housing, energizeable means disposed in said housing for providing light when said energizeable means is energized, said energizeable means including first and second sources of light, a prism disposed in said housing, said prism having a pair of light receiving faces disposed in planes which intersect at an apex adjacent to said energizeable means and which receive light from said energizeable means when said energizeable means is energized, said prism having a light emitting face through which light which enters said prism through said light receiving faces is emitted, and a divider panel disposed in said housing in engagement with said prism, said divider panel cooperating with said housing to at least partially define first and second compartments, said first light source being disposed in said first compartment and said second light source being disposed in said second compartment to enable an observer of said display system to determine when one of said first and second sources of light fails to emit light upon energization of said energizeable means.

15. A display system as set forth in claim 14 further including a display panel disposed in said housing adjacent to said light emitting face of said prism, said display panel having indicia thereon which is exposed to light transmitted from said light emitting face of said prism and which is observable when said energizeable means is energized even when said display panel is exposed to bright sunlight, the indicia on said display panel being obscured when said energizeable means is not energized and said display panel is exposed to bright sunlight.

16. A display system as set forth in claim 14 wherein said prism includes surface means for forming a slot in said prism, said slot extending away from the apex into said prism, said divider panel extending into said slot in said prism.

17. A display system as set forth in claim 16 wherein said surface means for forming a slot includes a first surface forming a first side of the slot and a second surface forming a second side of the slot, said first and second surfaces of the slot engaging opposite sides of the divider panel.

18. A display system as set forth in claim 17 wherein said light emitting face of said prism has a series of parallel V-shaped grooves formed therein, said V-shaped grooves having a series of side surfaces which intersect to form a series of parallel ridges extending across the face of said prism in a direction transverse to planes containing said first and second surfaces which form sides of the slot.

19. A display system as set forth in claim 14 further including a first reflector disposed in said first compartment for directing at least a portion of the light from said first light source toward a first one of said light receiving faces, and a second reflector disposed in said second compartment for directing at least a portion of the light from said second light source toward a second one of said light receiving faces.

* * * * *

UNITED STATES PATENT AND TRADEMARK OFFICE
CERTIFICATE OF CORRECTION

PATENT NO. : 5,295,050

DATED : March 15, 1994

INVENTOR(S) : Robert P. Helstern and Vanacan Tatavossian

It is certified that error appears in the above-identified patent and that said Letters Patent is hereby corrected as shown below:

Column 9, line 6, change "indica" to --indicia--.

Signed and Sealed this

Sixteenth Day of August, 1994

Attest:

BRUCE LEHMAN

*Attesting Officer*     Commissioner of Patents and Trademarks